(12) United States Patent  
Yamashita (10) Patent No.: US 12,262,142 B2  
(45) Date of Patent: Mar. 25, 2025

(54) DATA RECORDING SYSTEM AND METHOD OF CONTROLLING DATA RECORDING SYSTEM

(71) Applicant: Panasonic Intellectual Property Management Co., Ltd., Osaka (JP)

(72) Inventor: Hideaki Yamashita, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 36 days.

(21) Appl. No.: 18/234,579

(22) Filed: Aug. 16, 2023

(65) Prior Publication Data

US 2023/0396730 A1     Dec. 7, 2023

Related U.S. Application Data

(63) Continuation of application No. PCT/JP2021/034685, filed on Sep. 22, 2021.

(30) Foreign Application Priority Data

Feb. 25, 2021   (JP) ................. 2021-028127

(51) Int. Cl.
*H04N 5/91* (2006.01)
*H04N 5/907* (2006.01)
*H04N 1/21* (2006.01)

(52) U.S. Cl.
CPC .............. *H04N 5/91* (2013.01); *H04N 5/907* (2013.01)

(58) Field of Classification Search
CPC .................. H04N 5/91; H04N 1/21

(Continued)

(56) References Cited

U.S. PATENT DOCUMENTS

2003/0236884 A1   12/2003   Yamamoto et al.
2009/0190470 A1    7/2009   Hinosugi et al.
(Continued)

FOREIGN PATENT DOCUMENTS

JP   2003-345631   12/2003
JP   2009-182546    8/2009
(Continued)

OTHER PUBLICATIONS

International Search Report (ISR) issued on Dec. 14, 2021 in International (PCT) Application No. PCT/JP2021/034685.

*Primary Examiner* — Daquan Zhao
(74) *Attorney, Agent, or Firm* — Wenderoth, Lind & Ponack, L.L.P.

(57) ABSTRACT

A control apparatus reserves a first recording region and a second recording region in a recording apparatus based on a first reservation command and a second reservation command, respectively, and transmits first access information concerning the first recording region and second access information concerning the second recording region to a first video processing apparatus and a second video processing apparatus, respectively. The first video processing apparatus generates a first recording command based on the received first access information, and transmits the first recording command with first video data to the recording apparatus using a protocol of the recording apparatus. The second video processing apparatus generates a second recording command based on the received second access information, and transmits the second recording command with second video data to the recording apparatus using the protocol of the recording apparatus.

6 Claims, 4 Drawing Sheets

(58) Field of Classification Search
USPC .................. 386/294, 295, 239, 248, 291
See application file for complete search history.

(56) References Cited

U.S. PATENT DOCUMENTS

| | | |
|---|---|---|
| 2012/0128320 A1 | 5/2012 | Nakamura et al. |
| 2015/0193159 A1 | 7/2015 | Jo et al. |
| 2016/0274792 A1 | 9/2016 | Ogawa |
| 2019/0317691 A1 | 10/2019 | Kanno |
| 2020/0241750 A1 | 7/2020 | Kanno |

FOREIGN PATENT DOCUMENTS

| | | |
|---|---|---|
| JP | 4881887 | 2/2012 |
| JP | 2012-75046 | 4/2012 |
| JP | 2012-129969 | 7/2012 |
| JP | 2019-185596 | 10/2019 |
| JP | 2020-123039 | 8/2020 |
| WO | 2012/011301 | 1/2012 |
| WO | 2015/076354 | 5/2015 |

DATA RECORDING SYSTEM AND METHOD OF CONTROLLING DATA RECORDING SYSTEM

CROSS REFERENCE TO RELATED APPLICATIONS

This is a continuation application of PCT International Application No. PCT/JP2021/034685 filed on Sep. 22, 2021, designating the United States of America, which is based on and claims priority of Japanese Patent Application No. 2021-028127 filed on Feb. 25, 2021. The entire disclosures of the above-identified applications, including the specifications, drawings and claims are incorporated herein by reference in their entirety.

FIELD

The present disclosure relates to a data recording system and a method of controlling a data recording system.

BACKGROUND

Data recording systems each including host apparatuses and a storage which are connected to a network are known (for example, see Patent Literature (PTL) 1). Each of the host apparatuses can directly access to the storage via the network using the protocol of the storage. At this time, when the host apparatuses access to the storage all at once, occurrence of garbage collection or the like in the storage leads to a reduced data write rate, resulting in congestion of the communication bandwidth for the storage.

CITATION LIST

Patent Literature

PTL 1: Japanese Unexamined Patent Application Publication No. 2019-185596

SUMMARY

Technical Problem

The present disclosure relates to a data recording system which can suppress congestion of the communication bandwidth for a recording apparatus and a method of controlling a data recording system.

Solution to Problem

The data recording system according to the present disclosure includes a first data processing apparatus, a second data processing apparatus, a recording apparatus, and a control apparatus, the first data processing apparatus, the second data processing apparatus, the recording apparatus, and the control apparatus being connected to each other via a network. Here, the first data processing apparatus transmits a first reservation command to the control apparatus, the first reservation command being for instructing to reserve a first recording region for writing first data in the recording apparatus. The second data processing apparatus transmits a second reservation command to the control apparatus, the second reservation command being for instructing to reserve a second recording region for writing second data in the recording apparatus. The control apparatus reserves the first recording region and the second recording region in the recording apparatus based on the first reservation command and the second reservation command which are received, respectively, and transmits first access information concerning the first recording region and second access information concerning the second recording region to the first data processing apparatus and the second data processing apparatus, respectively. The first data processing apparatus generates a first recording command for instructing to write the first data to the first recording region, based on the first access information received, and transmits the first recording command with the first data to the recording apparatus using a protocol of the recording apparatus. The second data processing apparatus generates a second recording command for instructing to write the second data to the second recording region, based on the second access information received, and transmits the second recording command with the second data to the recording apparatus using the protocol of the recording apparatus. The recording apparatus writes the first data to the first recording region based on the first recording command received, and writes the second data to the second recording region based on the second recording command received.

Advantageous Effects

The data recording system according to the present disclosure and the like can suppress congestion of the communication bandwidth for a recording apparatus.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Hereinafter, an embodiment will be described in detail with reference to the drawings. To be noted, detailed description beyond necessity may be omitted in some cases. For example, detailed descriptions of things already well known and overlapping descriptions of substantially identical configurations may be omitted in some cases. This is for avoiding unnecessarily redundant description below and facilitating understanding by persons skilled in the art.

The present inventor provides the attached drawings and the description below to make persons skilled in the art sufficiently understand the present disclosure, and is not intended to limit the subject described in Claims with these.

EMBODIMENT

Hereinafter, an embodiment will be described with reference to FIGS. 1 to 5.

[1. Configuration of Data Recording System]

Figure 1:
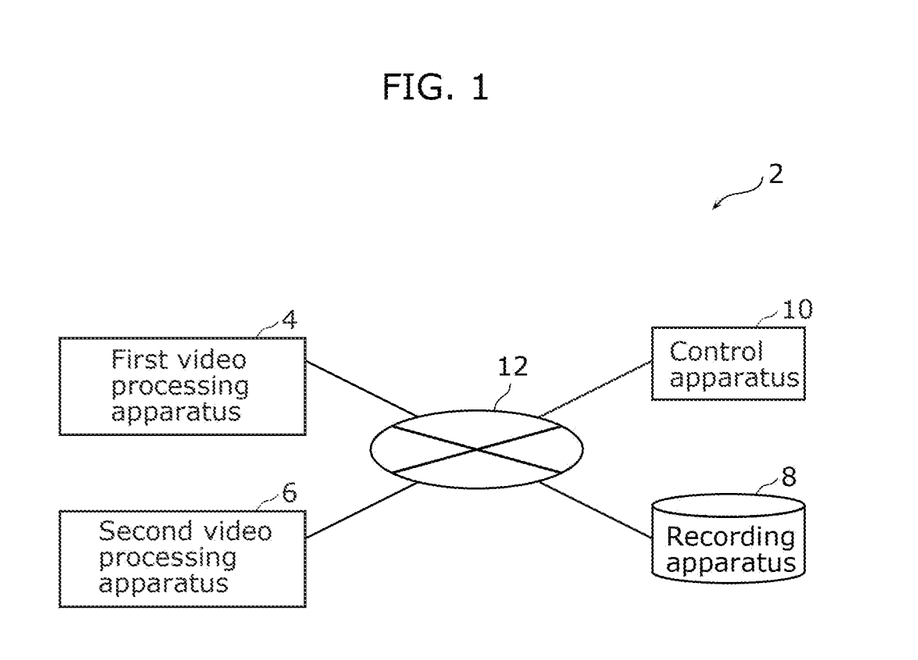
FIG. 1 is a block diagram illustrating a configuration of the data recording system according to an embodiment.

First, the configuration of data recording system 2 according to an embodiment will be described with reference to FIG. 1. FIG. 1 is a block diagram illustrating the configuration of data recording system 2 according to the embodiment.

As illustrated in FIG. 1, data recording system 2 according to the embodiment includes first video processing apparatus 4 (one example of a first data processing apparatus), second video processing apparatus 6 (one example of a second data processing apparatus), recording apparatus 8, and control apparatus 10. These first video processing apparatus 4, second video processing apparatus 6, recording apparatus 8, and control apparatus 10 are communicably connected to network 12. Network 12 is configured with Ethernet (registered trademark), for example.

First video processing apparatus 4 is a host apparatus for processing first video data (one example of first data) indicating a first video, and is a video editing apparatus, for example. First video processing apparatus 4 includes a memory for recording software programs, such as a read only memory (ROM) or a random access memory (RAM), a central processing unit (CPU) which reads out and executes the software programs recorded in the memory, a communication interface for communicating with other apparatuses via network 12, and a storage for recording the first video data. The storage is a solid state drive (SSD) including a NAND flash memory, for example.

Second video processing apparatus 6 is a host apparatus for processing second video data (one example of second data) indicating a second video, and is a video recording/reproducing apparatus, for example. Second video processing apparatus 6 includes a memory for recording software programs, such as a ROM or a RAM, a CPU which reads out and executes the software programs recorded in the memory, a communication interface for communicating with other apparatuses via network 12, and a storage for recording the second video data. The storage is a solid state drive (SSD) including a NAND flash memory, for example.

Recording apparatus 8 is a storage unit for recording a variety of pieces of data. Recording apparatus 8 includes a memory for recording software programs, such as a ROM or a RAM, a CPU which reads out and executes the software programs recorded in the memory, a communication interface for communicating with other apparatuses via network 12, and a storage for recording a variety of pieces of data. The storage is an SSD including a NAND flash memory, for example. In the storage included in recording apparatus 8, data is written in units of pages, and is deleted in units of blocks, each block including a plurality of pages. Recording apparatus 8 is accessed from other apparatuses via network 12 using a protocol of the storage included in recording apparatus 8, such as Non-Volatile Memory express-over Fabrics (NVMe-oF). Inside recording apparatus 8, access is executed using a protocol of the storage included in recording apparatus 8, such as NVMe.

In data recording system 2 described above, first video processing apparatus 4 and second video processing apparatus 6 can directly access to recording apparatus 8 via network 12 using the protocol of the storage including in recording apparatus 8.

Control apparatus 10 is an adjustment module for performing adjustment to avoid congestion of the communication bandwidth for recording apparatus 8 when first video processing apparatus 4 and second video processing apparatus 6 access to recording apparatus 8 all at once, the communication bandwidth being needed for access from first video processing apparatus 4 and second video processing apparatus 6. Control apparatus 10 includes a memory for recording software programs, such as a ROM or a RAM, a CPU which reads out and executes the software programs recorded in the memory, and a communication interface for communicating with other apparatuses via network 12. Components of control apparatus 10 (communicator 14, reserver 16, generator 18, and controller 19 described later) are implemented by the CPU reading out and executing the software programs recorded in the memory.

[2. Functional Configuration of Control Apparatus]

Figure 2:
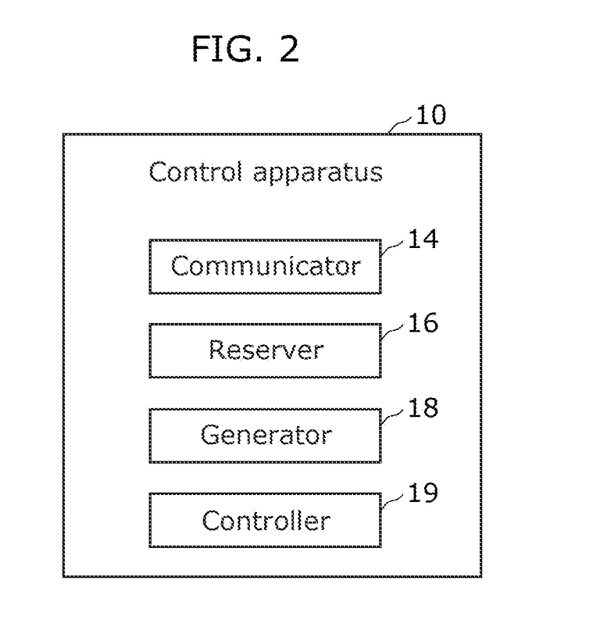
FIG. 2 is a block diagram illustrating a functional configuration of the control apparatus according to the embodiment.

Next, the functional configuration of control apparatus 10 will be described with reference to FIG. 2. FIG. 2 is a block diagram illustrating the functional configuration of control apparatus 10 according to the embodiment.

As illustrated in FIG. 2, control apparatus 10 includes communicator 14, reserver 16, generator 18, and controller 19 in the functional configuration.

Communicator 14 is a communication interface which transmits and receives a variety of pieces of data to and from first video processing apparatus 4, second video processing apparatus 6, and recording apparatus 8.

Reserver 16 reserves a first recording region for writing first video data in the storage included in recording apparatus 8, based on a first reservation command (described later) from first video processing apparatus 4. Reserver 16 also reserves a second recording region for writing second video data in the storage included in recording apparatus 8, based on a second reservation command (described later) from second video processing apparatus 6. The first recording region and the second recording region each are a recording region in the storage included in recording apparatus 8, the recording region containing a single block or a plurality of continuous blocks.

Generator 18 generates first access information (described later) concerning the first recording region reserved by reserver 16. Generator 18 also generates second access information (described later) concerning the second recording region reserved by reserver 16.

Controller 19 executes a variety of processings for controlling control apparatus 10.

[3. Operation of Data Recording System]

Figure 3:
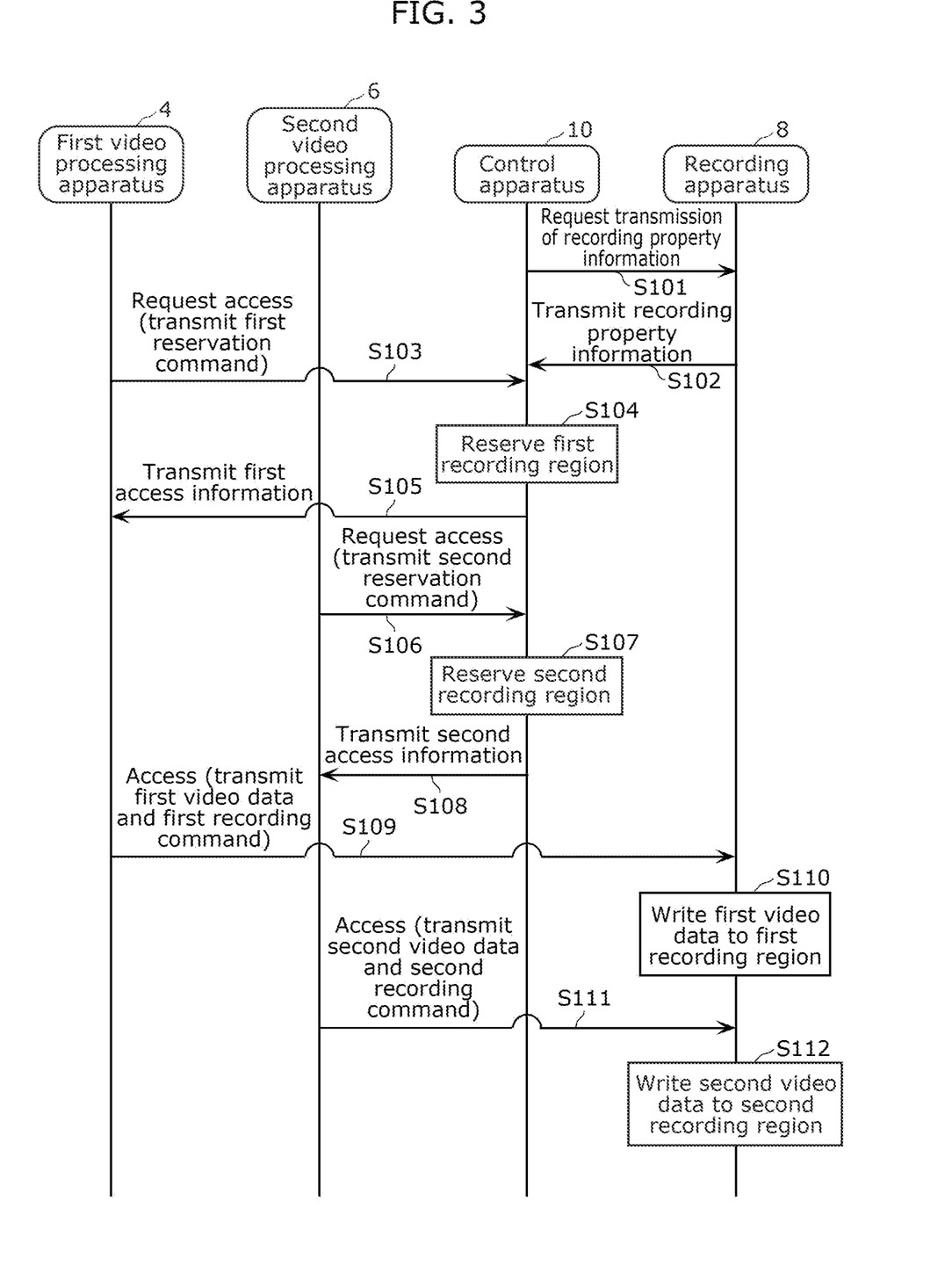
FIG. 3 is a sequence diagram illustrating a flow of an operation of the data recording system according to the embodiment.
Figure 4:
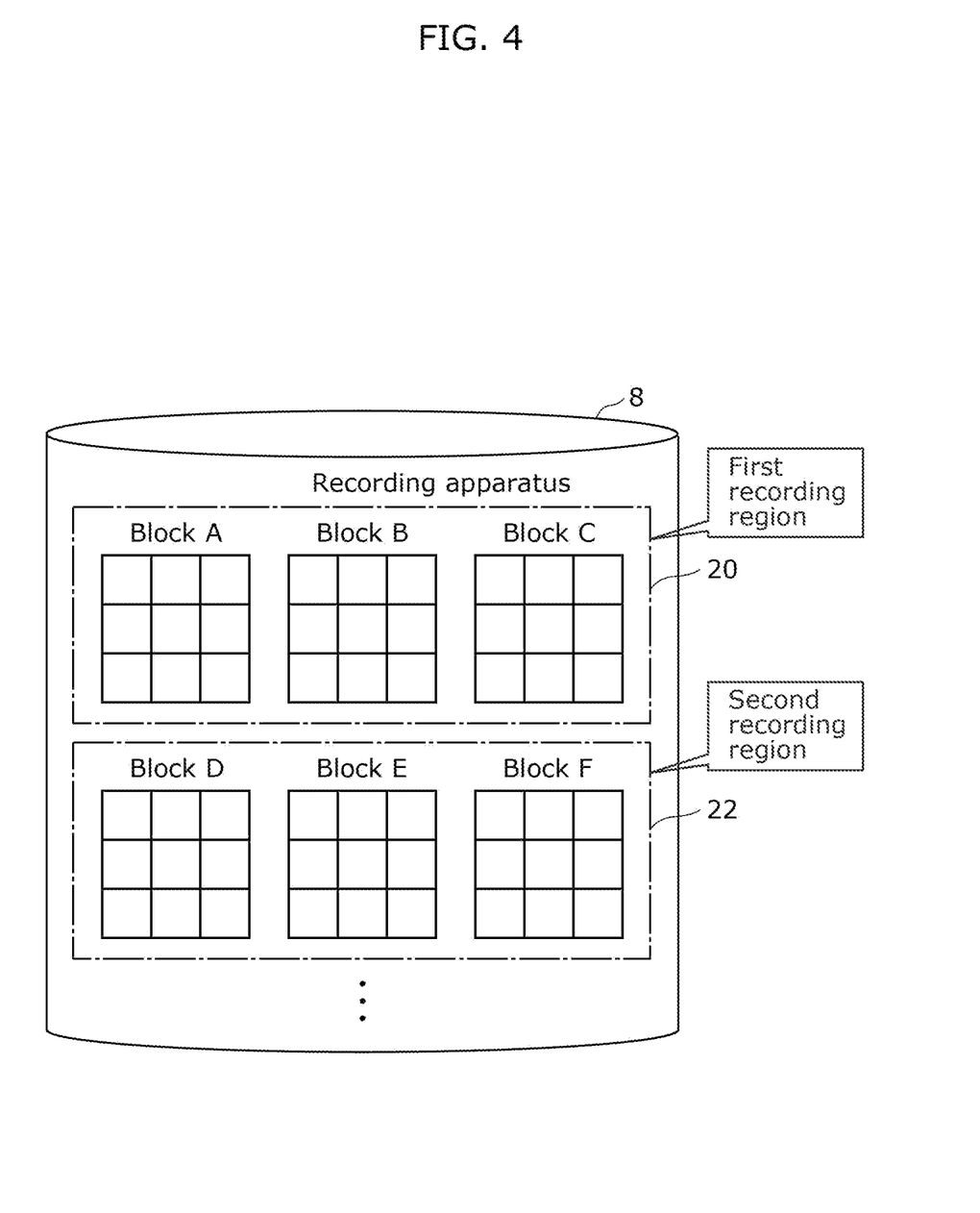
FIG. 4 is a conceptual diagram for illustrating one example of a first recording region and a second recording region.

Next, the operation of data recording system 2 according to the embodiment will be described with reference to FIGS. 3 and 4. FIG. 3 is a sequence diagram illustrating a flow of the operation of data recording system 2 according to the embodiment. FIG. 4 is a conceptual diagram for illustrating one example of first recording region 20 and second recording region 22.

Hereinafter, a case where first video processing apparatus 4 and second video processing apparatus 6 write the first video data and the second video data in the storage included in recording apparatus 8 via network 12, respectively, using the protocol of the storage included in recording apparatus 8 will be described.

As illustrated in FIG. 3, first, communicator 14 of control apparatus 10 requests transmission of recording property information of recording apparatus 8 via network 12 (S101). The recording property information is, for example, information indicating the page size of the storage included in recording apparatus 8, the block size thereof, and the performance thereof in units of pages. The performance in units of pages is the time needed to write data per page, for example.

Recording apparatus 8 receives the request from control apparatus 10, and transmits the recording property information to control apparatus 10 via network 12 (S102). Communicator 14 in control apparatus 10 receives the recording property information from recording apparatus 8, and stores the received recording property information in a memory (not illustrated), such as a ROM or a RAM.

First video processing apparatus 4 requests access of control apparatus 10 via network 12 (S103). Specifically, first video processing apparatus 4 transmits the first reservation command to control apparatus 10 via network 12. The first reservation command is a command signal for instructing control apparatus 10 to reserve the first recording region for writing the first video data in the storage included in recording apparatus 8. The first reservation command contains a) first data size information indicating the data size of the first video data and b) first bandwidth information indicating the first communication bandwidth (e.g., 2 Gbps) needed to write the first video data to the storage included in recording apparatus 8, for example. In other words, the first communication bandwidth is the recording rate needed to write the first video data to the storage included in recording apparatus 8.

Communicator 14 in control apparatus 10 receives the first reservation command from first video processing apparatus 4. Reserver 16 in control apparatus 10 reserves first recording region to which the first video data having a data size requested from first video processing apparatus 4 can be written, in the storage included in recording apparatus 8 based on the first reservation command received by communicator 14 (S104). Although reserver 16 in control apparatus 10 reserves first recording region 20 in the present embodiment, the configuration is not limited to this. First video processing apparatus 4 may reserve first recording region 20. In this case, the processings in steps S103 to S105 in FIG. 3 can be omitted. Namely, first video processing apparatus 4, when accessing to recording apparatus 8, reserves first recording region 20, and then writes the first video data to first recording region 20 of recording apparatus 8.

In the example illustrated in FIG. 4, first recording region 20 is a recording region containing three continuous blocks (blocks A, B, and C) in recording apparatus 8. Here, assume that blocks A, B, and C illustrated in FIG. 4 all are blank blocks without data written. In the example illustrated in FIG. 4, each of nine squares arranged in 3 rows×3 columns in a block represents a page.

To be noted, data may be written to a blank page in a block containing pages to which data is written. The data can be written to continuous blank pages with a one-time recording command. At this time, when blank pages are continuous in the region, the recording rate becomes higher because the recording command is issued only one time, reducing overhead compared to the case where the recording command is issued for each of blank pages dispersed and the data is written. In contrast, when blank pages are dispersed, the recording rate becomes lower because the data cannot be written with a one-time recording command (namely, the recording command need be issued for each of blank pages dispersed), increasing overhead compared to the case where blank pages are continuous in the region. Accordingly, in this case, to maintain the recording rate, it is necessary to periodically execute garbage collection to collect blank pages.

In some cases, when recording apparatus 8 receives the recording command, the data may be written after execution of garbage collection. In such a case, the recording rate becomes lower by the execution of garbage collection. For this reason, it is desired to write the data after reserving the recording region in units of blocks to avoid occurrence of dispersed blank pages, which causes execution of garbage collection.

Communicator 14 in control apparatus 10 confirms the emptiness of the block in recording apparatus 8 via network 12 in a predetermined cycle. Thereby, reserver 16 in control apparatus 10 grasps the emptiness of the block in recording apparatus 8 in real time.

Generator 18 in control apparatus 10 generates the first access information concerning first recording region 20 reserved by reserver 16, based on the recording property information and the first bandwidth information. The first access information contains a) information indicating the addresses of the blocks contained in first recording region 20 which is reserved, b) information indicating the size of the first video data to be transmitted within a predetermined time, and c) information indicating the interval of transmission of the first video data, for example. Here, generator 18 determines the size of the first video data to be transmitted within a predetermined time and the interval of transmission of the first video data such that first video processing apparatus 4 can transmit the first video data to recording apparatus 8 in the first communication bandwidth (e.g., 2 Gbps).

Communicator 14 in control apparatus 10 transmits first access information generated by generator 18 to first video processing apparatus 4 via network 12 (S105). First video processing apparatus 4 receives the first access information from control apparatus 10, and stores the received first access information in the above-mentioned memory such as a ROM or a RAM.

Subsequently, second video processing apparatus 6 requests access of control apparatus 10 via network 12 (S106). Specifically, second video processing apparatus 6 transmits the second reservation command to control apparatus 10 via network 12. The second reservation command is a command signal for instructing control apparatus 10 to reserve second recording region 22 (see FIG. 4) for writing the second video data in the storage included in recording apparatus 8. The second reservation command contains a) second data size information indicating the data size of the second video data and b) second bandwidth information indicating the second communication bandwidth (e.g., 3 Gbps) needed to write the second video data to the storage included in recording apparatus 8, for example. In other words, the second communication bandwidth is the recording rate required to write the second video data to the storage included in recording apparatus 8.

Communicator 14 in control apparatus 10 receives the second reservation command from second video processing apparatus 6. Reserver 16 in control apparatus 10 reserves second recording region 22 to which the second video data having a data size required from second video processing apparatus 6 can be written, in the storage included in recording apparatus 8 based on the second reservation command received by communicator 14 (S107). Although reserver 16 in control apparatus 10 reserves second recording region 22 in the present embodiment, any other configuration can be used. Second video processing apparatus 6 may reserve second recording region 22. In this case, the processings in steps S106 to S108 in FIG. 3 can be omitted. Specifically, second video processing apparatus 6, when accessing to recording apparatus 8, reserves second recording region 22, and then writes the second video data to second recording region 22 in recording apparatus 8.

In the example illustrated in FIG. 4, second recording region 22 is a recording region containing three continuous blocks (blocks D, E, and F) in recording apparatus 8. Here, assume that blocks D, E, and F illustrated in FIG. 4 all are blank blocks without data written.

Generator 18 in control apparatus 10 generates the second access information concerning second recording region 22 reserved by reserver 16, based on the recording property information and the second bandwidth information. The second access information contains a) information indicating the addresses of the blocks contained in second recording region 22 which is reserved, b) information indicating the size of the second video data to be transmitted within a predetermined time, and c) information indicating the interval of transmission of the second video data. Here, generator 18 determines the size of the second video data to be transmitted within a predetermined time and the interval of transmission of the second video data such that second video processing apparatus 6 can transmit the second video data to recording apparatus 8 with the second communication bandwidth (e.g., 3 Gbps).

Communicator 14 in control apparatus 10 transmits the second access information generated by generator 18 to second video processing apparatus 6 via network 12 (S108). Second video processing apparatus 6 receives the second access information from control apparatus 10, and stores the received second access information in the above-mentioned memory such as a ROM or a RAM First video processing apparatus 4 directly accesses to recording apparatus 8 via network 12 based on the first access information from control apparatus 10, using the protocol of the storage included in recording apparatus 8 (S109). Specifically, first video processing apparatus 4 generates the first recording command based on the first access information from control apparatus 10, and transmits the generated first recording command with the first video data to recording apparatus 8. The first recording command is a command signal for instructing recording apparatus 8 to write the first video data to first recording region 20. The first recording command contains a) information indicating the address of the first video data to be transferred, b) information indicating the size of the first video data to be transmitted, and c) information indicating the addresses of blocks contained in first recording region 20 to which the first video data is transferred, for example. Here, first video processing apparatus 4 transmits the first video data to recording apparatus 8 with the transmission size and interval indicated by the first access information.

In the processing in step S109 described above, as Processing Example 1, first video processing apparatus 4 may transmit the first recording command to recording apparatus 8 as in the present embodiment, or as Processing Example 2 described below, the first recording command may be stored in first video processing apparatus 4, and recording apparatus 8 may read out the first recording command from first video processing apparatus 4. Here, a specific example of Processing Example 2 will be described. First video processing apparatus 4 places the first video data to be written in a memory space within first video processing apparatus 4 accessible via network 12. Next, first video processing apparatus 4 generates the first recording command for the first video data to be written in the memory space within first video processing apparatus 4 accessible via network 12. Next, first video processing apparatus 4 writes information in a register of recording apparatus 8, the information indicating that the first recording command is generated. Next, recording apparatus 8 reads out the first recording command within first video processing apparatus 4, and analyzes it. Next, recording apparatus 8 transfers the first video data within first video processing apparatus 4 to recording apparatus 8. When the transfer is completed, recording apparatus 8 notifies first video processing apparatus 4 of the completion of the transfer. The above specific example of the processing can also be applied to step S111 described later in the same manner.

Recording apparatus 8 writes the first video data to first recording region 20 based on the first recording command from first video processing apparatus 4 (S110). Specifically, recording apparatus 8 continuously writes the first video data from the leading page of the leading block (block A illustrated in FIG. 4) contained in first recording region 20.

Second video processing apparatus 6 directly accesses to recording apparatus 8 via network 12 based on the second access information from control apparatus 10, using the protocol of the storage included in recording apparatus 8 (S111). Specifically, second video processing apparatus 6 generates the second recording command based on the second access information from control apparatus 10, and transmits the generated second recording command with the second video data to recording apparatus 8. The second recording command is a command signal for instructing recording apparatus 8 to write the second video data to second recording region 22. The second recording command contains a) information indicating the address of the second video data to be transferred, b) information indicating the size of the second video data to be transferred, and c) information indicating the addresses of the blocks contained in second recording region 22 to which the second video data is transferred, for example. Here, second video processing apparatus 6 transmits the second video data to recording apparatus 8 with the transmission size and interval indicated by the second access information.

Recording apparatus 8 writes the second video data to second recording region 22 based on the second recording command from second video processing apparatus 6 (S112). Specifically, recording apparatus 8 continuously writes the second video data from the leading page of the leading block (block D illustrated in FIG. 4) contained in second recording region 22.

4. Effects

In the present embodiment, data recording system 2 includes first video processing apparatus 4, second video processing apparatus 6, recording apparatus 8, and control apparatus 10 connected to each other via network 12. First video processing apparatus 4 transmits a first reservation command to control apparatus 10, the first reservation command being for instructing to reserve first recording region 20 in recording apparatus 8 to which first video data is written. Second video processing apparatus 6 transmits a second reservation command to control apparatus 10, the second reservation command being for instructing to reserve second recording region 22 in recording apparatus 8 to which second video data is written. Control apparatus 10 reserves first recording region 20 and second recording region 22 in recording apparatus 8 based on the received first reservation command and second reservation command, respectively, and transmits first access information concerning first recording region 20 and second access information concerning second recording region 22 to first video processing apparatus 4 and second video processing apparatus 6, respectively. First video processing apparatus 4 generates a first recording command for instructing to write the first video data to first recording region 20, based on the received first access information, and transmits the generated first recording command with the first video data to recording apparatus 8 using the protocol of recording apparatus 8. Second video processing apparatus 6 generates a second recording command for instructing to write the second video data to second recording region 22, based on the received second access information, and transmits the generated second recording command with the second video data to recording apparatus 8 using the protocol of recording apparatus 8. Recording apparatus 8 writes the first video data to first recording region 20 based on the received first recording command, and writes the second video data to second recording region 22 based on the received second recording command.

In such a configuration, recording apparatus 8 writes the first video data to first recording region 20 reserved based on the first reservation command, and writes the second video data to second recording region 22 reserved based on the second reservation command. Thereby, even when first video processing apparatus 4 and second video processing apparatus 6 access to recording apparatus 8 all at once, for example, the first video data and the second video data can be efficiently written to first recording region and second recording region 22, respectively, while occurrence of garbage collection is suppressed. Thus, congestion of the communication bandwidth for recording apparatus 8 can be suppressed. As a result, when the first video data and the second video data are written to recording apparatus 8, occurrence of drop frame in the first video data and the second video data can be suppressed.

In the present embodiment, recording apparatus 8 transmits recording property information concerning recording properties of recording apparatus 8 to control apparatus 10. First video processing apparatus 4 transmits first bandwidth information to control apparatus 10, the first bandwidth information concerning first communication bandwidth needed to write the first video data to recording apparatus 8. Second video processing apparatus 6 transmits second bandwidth information to control apparatus 10, the second bandwidth information concerning second communication bandwidth needed to write the second video data to recording apparatus 8. Control apparatus 10 generates first access information based on the recording property information and the first bandwidth information, and generates second access information based on the recording property information and the second bandwidth information.

In such a configuration, the first access information can be generated in consideration of the recording properties of recording apparatus 8 and the first communication bandwidth. Moreover, the second access information can be generated in consideration of the recording properties of recording apparatus 8 and the second communication bandwidth.

In the present embodiment, recording apparatus 8 includes a flash memory in which data is written in units of pages and is deleted in units of blocks each block including a plurality of pages. First recording region 20 and second recording region 22 each contain a single block or a plurality of continuous blocks in recording apparatus 8.

In such a configuration, first recording region 20 and second recording region 22 can be configured of blocks in the flash memory.

In the present embodiment, the method of controlling data recording system 2 is a method of controlling data recording system 2 including first video processing apparatus 4, second video processing apparatus 6, recording apparatus 8, and control apparatus 10 connected to each other via network 12. The method of controlling data recording system 2 includes (a) transmitting, by first video processing apparatus 4, a first reservation command to control apparatus 10, the first reservation command being for instructing to reserve first recording region 20 for writing first video data in recording apparatus 8; (b) transmitting, by second video processing apparatus 6, a second reservation command to control apparatus 10, the second reservation command being for instructing to reserve second recording region 22 for writing second video data in recording apparatus 8; (c) reserving, by control apparatus 10, first recording region 20 and second recording region 22 in recording apparatus 8 based on the first reservation command and the second reservation command which are received, respectively, and transmitting first access information concerning first recording region 20 and second access information concerning second recording region 22 to first video processing apparatus 4 and second video processing apparatus 6, respectively; (d) generating, by first video processing apparatus 4, a first recording command for instructing to write the first video data to first recording region 20, based on the first access information received, and transmitting the first recording command with the first video data to recording apparatus 8 using a protocol of recording apparatus 8; (e) generating, by second video processing apparatus 6, a second recording command for instructing to write the second video data to second recording region 22, based on the second access information received, and transmitting the second recording command with the second video data to recording apparatus 8 using the protocol of recording apparatus 8; and (f) writing, by recording apparatus 8, the first video data to first recording region 20 based on the first recording command received, and writing the second video data to second recording region 22 based on the second recording command received.

In such a configuration, recording apparatus 8 writes the first video data to first recording region 20 reserved based on the first reservation command, and writes the second video data to second recording region 22 reserved, based on the second reservation command. Thereby, even when first video processing apparatus 4 and second video processing apparatus 6 access to recording apparatus 8 all at once, for example, the first video data and the second video data can be efficiently written to first recording region and second recording region 22, respectively, while occurrence of garbage collection is suppressed. Thus, congestion of the communication bandwidth for recording apparatus 8 can be suppressed. As a result, when the first video data and the second video data are written to recording apparatus 8, occurrence of drop frame in the first video data and the second video data can be suppressed.

5. Modification

Figure 5:
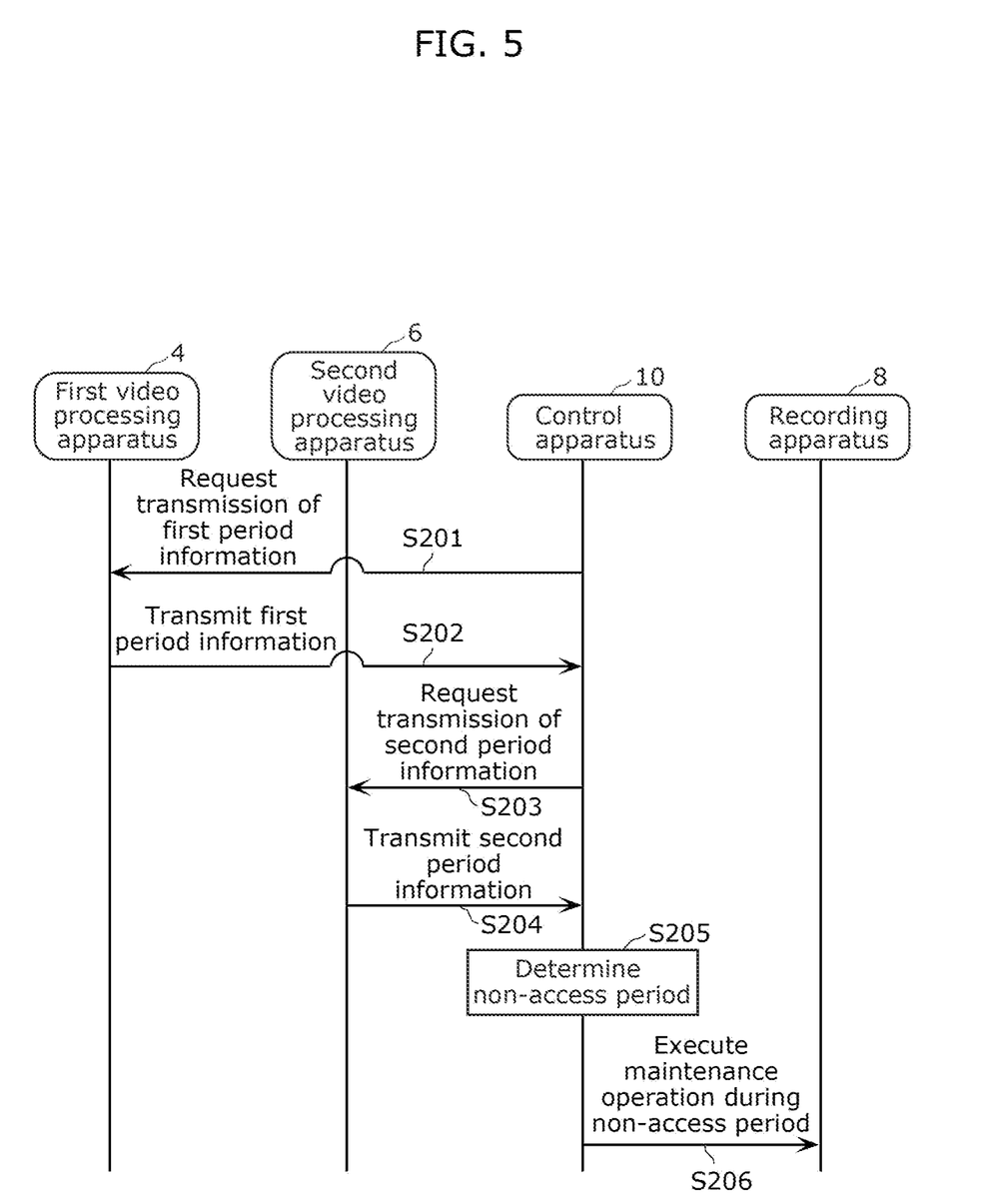
FIG. 5 is a sequence diagram illustrating a flow of the operation of the data recording system according to a modification of the embodiment.

A modification of the operation of data recording system 2 according to the embodiment will be described with reference to FIG. 5. FIG. 5 is a sequence diagram illustrating a flow of the operation of data recording system 2 according to a modification of the embodiment.

As illustrated in FIG. 5, first, communicator 14 in control apparatus 10 requests transmission of the first period information of first video processing apparatus 4 (S201). The first period information is information concerning the period during which first video processing apparatus 4 does not access to recording apparatus 8 (for example, 20 o'clock to 24 o'clock of the day).

In response to the request from control apparatus 10, first video processing apparatus 4 transmits the first period information to control apparatus 10 via network 12 (S202). Communicator 14 in control apparatus 10 receives the first period information from first video processing apparatus 4.

Next, communicator 14 in control apparatus 10 requests transmission of second period information of second video processing apparatus 6 (S203). The second period information is information concerning the period during which second video processing apparatus 6 does not access to recording apparatus 8 (for example, 18 o'clock to 20 o'clock of the day).

In response to the request from control apparatus 10, second video processing apparatus 6 transmits the second period information to control apparatus 10 via network 12 (S204). Communicator 14 in control apparatus 10 receives the second period information from second video processing apparatus 6.

Based on the first period information and the second period information, controller 19 in control apparatus 10 determines a non-access period during which neither first video processing apparatus 4 nor second video processing apparatus 6 accesses (for example, 18 o'clock to 24 o'clock of the day) (S205).

In the determined non-access period, controller 19 in control apparatus 10 executes a maintenance operation on first recording region 20 and second recording region 22 to which the first video data and second video data are written, respectively, in recording apparatus 8 (S206). The maintenance operation is an operation such as garbage collection and wear leveling.

As described above, in the present modification, first video processing apparatus 4 transmits first period information to control apparatus 10, the first period information concerning a period during which first video processing apparatus 4 does not access to recording apparatus 8. Second video processing apparatus 6 transmits second period information to control apparatus 10, the second period information concerning a period during which second video processing apparatus 6 does not access to recording apparatus 8. Based on the first period information and the second period information, control apparatus 10 executes a maintenance operation on first recording region 20 and second recording region 22 to which the first video data and second video data are written, respectively, in recording apparatus 8 in a period during which neither first video processing apparatus 4 nor second video processing apparatus 6 accesses.

In such a configuration, first video processing apparatus 4 and second video processing apparatus 6 all can efficiently execute the maintenance operation for recording apparatus 8 utilizing the non-access period during which neither of them accesses thereto.

Other Modifications

Thus, the above embodiment has been described as examples of the technique disclosed in the present application. However, the technique in the present disclosure is not limited to this, and can also be applied to embodiments obtained by the above embodiment subjected to appropriate change, replacement, addition, or omission. The components described in the above embodiment can also be combined into new embodiments.

Thus, other embodiments will be illustrated below.

Although data recording system 2 includes two video processing apparatuses (first video processing apparatus 4 and second video processing apparatus 6) in the above embodiment, any other configuration can be used, and data recording system 2 may include three or more video processing apparatuses.

Although control apparatus 10 is configured with hardware separated from recording apparatus 8 in the above embodiment, any other configuration can be used, and control apparatus 10 may be configured with a software program provided in recording apparatus 8. In other words, control apparatus 10 may be provided in recording apparatus 8. In this case, recording apparatus 8 reserves first recording region 20 and second recording region 22. In such a configuration, data recording system 2 can have a simplified configuration.

Although the storage included in recording apparatus 8 is an SSD in the above embodiment, any other configuration can be used, and the storage included in recording apparatus 8 may be a removable storage detachably attachable to an adaptor, such as a memory card.

When first video processing apparatus 4 and second video processing apparatus 6 access to recording apparatus 8, first video processing apparatus 4 and second video processing apparatus 6 may manage blank blocks of recording apparatus 8, or recording apparatus 8 may manage blank blocks of recording apparatus 8. When first video processing apparatus 4 and second video processing apparatus 6 manage blank blocks of recording apparatus 8, first video processing apparatus 4 and second video processing apparatus 6 may specify the block to be written, and may access to recording apparatus 8 with the number of pages which satisfies the bandwidth. In contrast, when recording apparatus 8 manages blank blocks of recording apparatus 8, first video processing apparatus 4 and second video processing apparatus 6 may obtain the stream ID of the reserved block from recording apparatus 8, and may specify the obtained stream ID to access to recording apparatus 8.

In the above embodiment, the components each may be configured with dedicated hardware, or may be implemented by executing software programs suitable for the components. The components may also be implemented by a program executor, such as a CPU or a processor, which reads out and executes software programs recorded on a recording medium such as a hard disk or a semiconductor memory.

Moreover, part or all of the functions of data recording system 2 according to the above embodiment may be implemented by a processor such as a CPU which executes programs.

As above, the embodiment has been described as examples of the technique in the present disclosure. For this purpose, the attached drawings and the detailed description have been provided.

Accordingly, the components described in the attached drawings and the detailed description may also contain not only components essential for solving the problem but also components which are not essential for solving the problem but described for illustration of the technique. For this reason, these non-essential components should not be immediately recognized as essential components because those non-essential components are described in the attached drawings and the detailed description.

Moreover, the above embodiment is for an illustration of the technique in the present disclosure, and therefore can be subjected to a variety of changes, replacements, additions, omissions, and the like within Claims or its equivalents.

INDUSTRIAL APPLICABILITY

The present disclosure is applicable to data recording systems including a plurality of data processing apparatuses which can directly access to a recording apparatus via a network using the protocol of the recording apparatus, for example.

The invention claimed is:

1. A data recording system comprising:
a first data processing apparatus;
a second data processing apparatus;
a recording apparatus; and
a control apparatus, the first data processing apparatus, the second data processing apparatus, the recording apparatus, and the control apparatus being connected to each other via a network,
wherein the first data processing apparatus transmits a first reservation command to the control apparatus, the first reservation command being for instructing to reserve a first recording region for writing first data in the recording apparatus,
the second data processing apparatus transmits a second reservation command to the control apparatus, the second reservation command being for instructing to reserve a second recording region for writing second data in the recording apparatus,
the control apparatus reserves the first recording region and the second recording region in the recording apparatus based on the first reservation command and the second reservation command which are received, respectively, and transmits first access information concerning the first recording region and second access information concerning the second recording region to the first data processing apparatus and the second data processing apparatus, respectively,
the first data processing apparatus generates a first recording command for instructing to write the first data to the first recording region, based on the first access information received, and transmits the first recording command with the first data to the recording apparatus using a protocol of the recording apparatus,
the second data processing apparatus generates a second recording command for instructing to write the second data to the second recording region, based on the second access information received, and transmits the second recording command with the second data to the recording apparatus using the protocol of the recording apparatus, and
the recording apparatus writes the first data to the first recording region based on the first recording command received, and writes the second data to the second recording region based on the second recording command received.

2. The data recording system according to claim 1,
wherein the recording apparatus transmits recording property information concerning recording properties of the recording apparatus to the control apparatus,
the first data processing apparatus transmits first bandwidth information concerning a first communication bandwidth to the control apparatus, the first bandwidth information being needed to write the first data to the recording apparatus,
the second data processing apparatus transmits second bandwidth information concerning a second communication bandwidth to the control apparatus, the second bandwidth information being needed to write the second data to the recording apparatus, and
the control apparatus generates the first access information based on the recording property information and the first bandwidth information, and generates the second access information based on the recording property information and the second bandwidth information.

3. The data recording system according to claim 1,
wherein the first data processing apparatus transmits first period information to the control apparatus, the first period information concerning a period during which the first data processing apparatus does not access to the recording apparatus,
the second data processing apparatus transmits second period information to the control apparatus, the second period information concerning a period during which the second data processing apparatus does not access to the recording apparatus, and
based on the first period information and the second period information, the control apparatus executes a maintenance operation on the first recording region and the second recording region to which the first data and the second data are written, respectively, in the recording apparatus in a period during which neither the first data processing apparatus nor the second data processing apparatus accesses to the recording apparatus.

4. The data recording system according to claim 1,
wherein the recording apparatus includes a flash memory in which data is written in units of pages and is deleted in units of blocks, each block including a plurality of pages, and
the first recording region and the second recording region each contain a single block or a plurality of continuous blocks in the recording apparatus.

5. The data recording system according to claim 1,
wherein the control apparatus is included in the recording apparatus.

6. A method of controlling a data recording system including a first data processing apparatus, a second data processing apparatus, a recording apparatus, and a control apparatus connected to each other via a network, the method comprising:
(a) transmitting, by the first data processing apparatus, a first reservation command to the control apparatus, the first reservation command being for instructing to reserve a first recording region for writing first data in the recording apparatus;
(b) transmitting, by the second data processing apparatus, a second reservation command to the control apparatus, the second reservation command being for instructing to reserve a second recording region for writing second data in the recording apparatus;
(c) reserving, by the control apparatus, the first recording region and the second recording region in the recording apparatus based on the first reservation command and the second reservation command which are received, respectively, and transmitting first access information concerning the first recording region and second access information concerning the second recording region to the first data processing apparatus and the second data processing apparatus, respectively;
(d) generating, by the first data processing apparatus, a first recording command for instructing to write the first data to the first recording region, based on the first access information received, and transmitting the first recording command with the first data to the recording apparatus using a protocol of the recording apparatus;
(e) generating, by the second data processing apparatus, a second recording command for instructing to write the second data to the second recording region, based on the second access information received, and transmitting the second recording command with the second data to the recording apparatus using the protocol of the recording apparatus; and (f) writing, by the recording apparatus, the first data to the first recording region based on the first recording command received, and writing the second data to the second recording region based on the second recording command received.

\* \* \* \* \*